US010921945B2

(12) United States Patent
Feng

(10) Patent No.: US 10,921,945 B2
(45) Date of Patent: Feb. 16, 2021

(54) RESISTIVE FORCE TOUCH CONTROL DEVICE

(71) Applicant: Wuhan China Star Optoelectronics Semiconductor Display Technology Co., Ltd., Wuhan (CN)

(72) Inventor: Xiaoliang Feng, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/467,989

(22) PCT Filed: Dec. 11, 2018

(86) PCT No.: PCT/CN2018/120409
§ 371 (c)(1),
(2) Date: Jun. 10, 2019

(87) PCT Pub. No.: WO2020/113621
PCT Pub. Date: Jun. 11, 2020

(65) Prior Publication Data
US 2020/0183519 A1    Jun. 11, 2020

(30) Foreign Application Priority Data
Dec. 3, 2018 (CN) .......................... 201811468047.5

(51) Int. Cl.
*G06F 3/045* (2006.01)
*G06F 3/047* (2006.01)
*G06F 3/041* (2006.01)

(52) U.S. Cl.
CPC .............. *G06F 3/045* (2013.01); *G06F 3/047* (2013.01); *G06F 3/0412* (2013.01); *G06F 2203/04112* (2013.01)

(58) Field of Classification Search
CPC ........ G06F 3/045; G06F 3/0412; G06F 3/047; G06F 2203/04112; G06F 2203/04104; G06F 3/04146
See application file for complete search history.

(56) References Cited

U.S. PATENT DOCUMENTS

2004/0238910 A1* 12/2004 Fujii ...................... H05K 3/361
257/433
2014/0041216 A1* 2/2014 Cok ...................... H05K 1/0287
29/846
2015/0077380 A1* 3/2015 Hayashi ................ G06F 3/0414
345/173

FOREIGN PATENT DOCUMENTS

CN         102236447 A  * 11/2011
KR       20100022748 A  *  3/2010

* cited by examiner

*Primary Examiner* — Abhishek Sarma

(57) ABSTRACT

The present invention provides a resistive force touch control device. The resistive force touch control device includes a first substrate and a second substrate spaced facing one another, a plurality of first wires parallelly spaced from one another and disposed on one side of the first substrate facing the second substrate, a plurality of second wires parallelly spaced from one another and disposed on one side of the second substrate facing the first substrate, and first anisotropic conductive adhesive located between the plurality of first wires and the plurality of second wires, wherein the plurality of first wires intersects the plurality of second wires. Therefore, force touch can be realized.

9 Claims, 9 Drawing Sheets

RESISTIVE FORCE TOUCH CONTROL DEVICE

RELATED APPLICATIONS

This application is a National Phase of PCT Patent Application No. PCT/CN2018/120409 having International filing date of Dec. 11, 2018, which claims the benefit of priority of Chinese Patent Application No. 201811468047.5 filed on Dec. 3, 2018. The contents of the above applications are all incorporated by reference as if fully set forth herein in their entirety.

FIELD AND BACKGROUND OF THE INVENTION

The present invention relates to touch control technology field, particularly to a resistive force touch control device.

With the rapid development of smartphones, conventional dumbphones have almost been replaced. At the same time, the size of the screen becomes larger and larger, and the input interface of a mobile phone changes from a conventional key input interface to a touch control interface, which leads to the rapid development of force touch control technology.

Because touch control devices have advantages such as being easy-to-use, intuitive and flexible, they have become the main human-machine interaction approach for personal mobile communication devices and comprehensive information terminals such as tablets, smartphones and notebooks. According to their mechanism touch control devices can be cataloged into four main types including resistive touch, capacitive touch, infrared touch and surface acoustic wave touch.

Among those resistive touch and capacitive touch are the most commonly used touch control devices, and capacitive touch control devices have become the mainstream nowadays due to advantages such as being sensitive. However, capacitive touch control devices also have some drawbacks such as being more easily affected by the environment (temperature, humidity, etc.) that results in drift phenomenon, and only supporting conductor input, which leads to being unable for a user to use when wearing gloves, therefore diminish user experience. Resistive touch as the mainstream touch control technology before capacitive touch, although having drawbacks such as inadequate sensibility, poor resistance to scratching and short lifetime, its inherent advantages such as relatively simple structure, high reliability, low cost and supporting various input medium (conductor, non-conductor) still make it, especially in some peculiar circumstances, applicable over a wide range of market applications. A resistive touch screen utilizes a set of controller and specially-coated glass on the surface of the display to produce touch connection signals. The panel of the touch screen has two layers of thin conductive films spaced away from one another with a thin gap. When a finger or other touch objects touch a point on the surface of the panel, the two conductive layers become connected and lead to a change in current such that the touch motion is detected.

Force touch is a new touch control technology that can operate according to the different degrees of the force exerted on a touch control device. Force touch display devices increasingly apply to display technology fields in various industries. When a user touches or presses a force touch control device, it can detect the degree of the press, whereby produces different signals such that the user can obtain different feedback information simply through the variation in force degrees of the press on the touch area, therefore provides various experiences when using the force touch control device.

SUMMARY OF THE INVENTION

An embodiment of the present invention is to provide a resistive force touch control device. Through the realizing of force touch in a resistive touch control device, the structure of the force touch control device can be simplified, the cost can be reduced and the range of the application of force touch can be widened.

The resistive force touch control device includes a first substrate and a second substrate spaced facing one another, a plurality of first wires parallelly spaced from one another and disposed on one side of the first substrate facing the second substrate, a plurality of second wires parallelly spaced from one another and disposed on one side of the second substrate facing the first substrate, and first anisotropic conductive adhesive located between the plurality of first wires and the plurality of second wires, wherein the plurality of first wires intersects the plurality of second wires.

According to an embodiment of the present invention, each of the plurality of first wires includes N first sub-wires parallelly spaced from one another, and the N first sub-wires of the same first wire have different heights, and each of the plurality of second wires includes N second sub-wires parallelly spaced from one another, and the N second sub-wires of the same second wire have different heights, and N is a positive integer greater than one.

According to an embodiment of the present invention, each of the plurality of first wires includes two parallelly spaced first sub-wires, and each of the plurality of second wires includes two parallelly spaced second sub-wires.

According to an embodiment of the present invention, each of the plurality of first wires includes three parallelly spaced first sub-wires, and each of the plurality of second wires includes three parallelly spaced second sub-wires.

According to an embodiment of the present invention, each of the plurality of second wires further includes a binding terminal, and one end of the N second sub-wires of each of the plurality of second wires is electrically connected to the corresponding binding terminal.

According to an embodiment of the present invention, the resistive force touch control device further includes a signal capturing module electrically connected to each of the binding terminals.

According to an embodiment of the present invention, each of the plurality of first wires is perpendicular to each of the plurality of second wires.

According to an embodiment of the present invention, the resistive force touch control device further includes a third wire located between the first anisotropic conductive adhesive and the plurality of first wires, and a second anisotropic conductive adhesive located between the third wire and the plurality of first wires, wherein the third wire intersects the plurality of first wires and the plurality of second wires at the positions where each of the plurality of first wires intersects each of the plurality of second wires.

According to an embodiment of the present invention, each of the plurality of first wires is perpendicular to each of the plurality of second wires, and the third wire slants with respect to each of the plurality of first wires.

According to an embodiment of the present invention, the resistive force touch control device further includes a fourth wire located between the second anisotropic conductive adhesive and the plurality of first wires, and a third anisotropic conductive adhesive located between the fourth wire and the plurality of first wires, wherein the fourth wire intersects the third wire, the plurality of first wires and the plurality of second wires at the positions where the third wire, each of the plurality of first wires, and each of the plurality of second wires intersect each other.

According to an embodiment of the present invention, each of the plurality of first wires is perpendicular to each of the plurality of second wires, the third wire slants with respect to each of the plurality of first wires, and the forth wire is perpendicular to the third wire.

The embodiments of the present invention are to provide a resistive force touch control device. When a force is exerted on the resistive force touch control device, the first sub-wires and the second sub-wires contact each other in order of their corresponding heights as the force increases, that is, from the sub-wires with higher heights to the sub-wires with lower heights, to produce different touch signals. Therefore force touch can be realized in a resistive touch control device, the structure of the force touch control device can be simplified, the cost can be reduced and the range of the application of force touch can be widened.

BRIEF DESCRIPTION OF THE SEVERAL VIEWS OF THE DRAWINGS

The present invention will become more fully understood from the following detailed description and the accompanying drawings which are given by way of illustration only and thus are not limitative of the present invention and wherein.

DETAILED DESCRIPTION OF PREFERRED SPECIFIC EMBODIMENTS OF THE INVENTION

Figure 1:
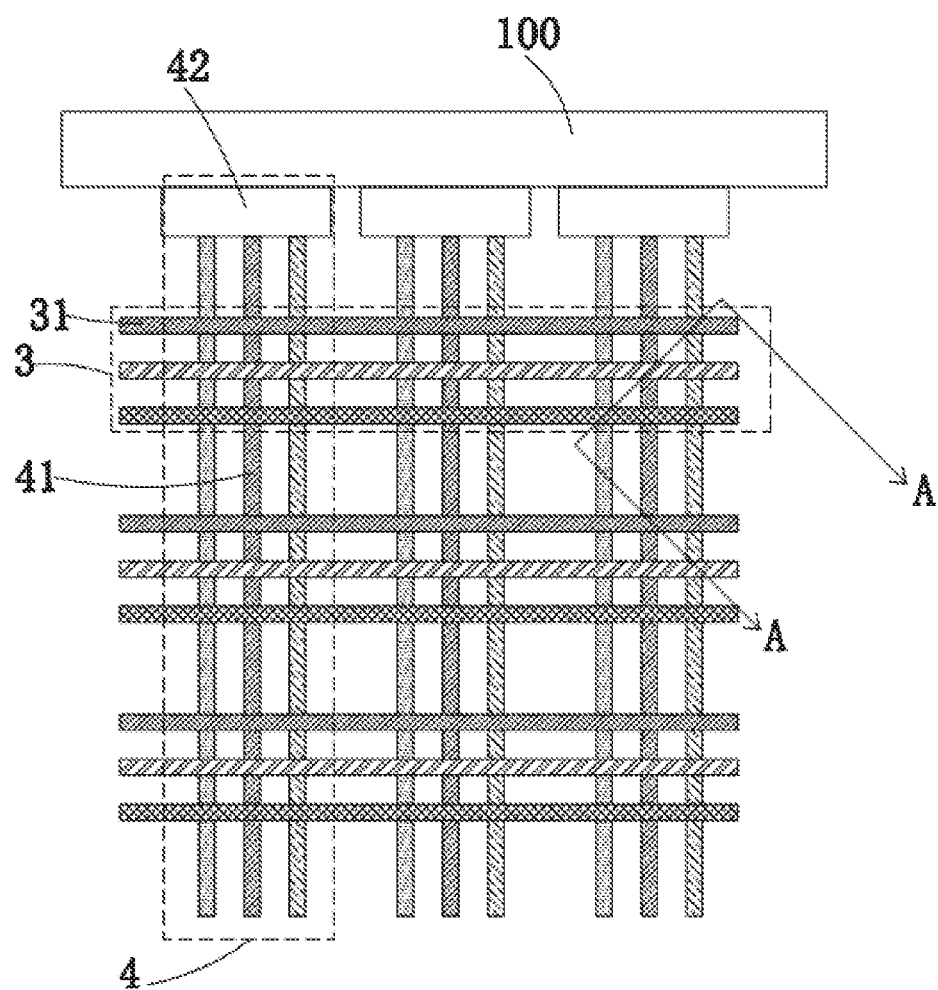
FIG. 1 is a top view of the resistive force touch control device according to the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1-FIG. 5. The present invention provides a resistive force touch control device including a first substrate 1 and a second substrate 2 spaced facing one another, a plurality of first wires 3 parallelly spaced from one another and disposed on one side of the first substrate 1 facing the second substrate 2, a plurality of second wires 4 parallelly spaced from one another and disposed on one side of the second substrate 2 facing the first substrate 1, and first anisotropic conductive adhesive 5 located between the plurality of first wires 3 and the plurality of second wires 4. The plurality of first wires 3 intersects the plurality of second wires 4.

Each of the plurality of first wires 3 includes N first sub-wires 31 parallelly spaced from one another, and the N first sub-wires 31 of the same first wire 3 have different heights. Each of the plurality of second wires 4 includes N second sub-wires 41 parallelly spaced from one another, and the N second sub-wires 41 of the same second wire 4 have different heights. N is a positive integer greater than one.

In particular, in some embodiments of the present invention, each of the plurality of first wires 3 includes two parallelly spaced first sub-wires 31, and each of the plurality of second wires 4 includes two parallelly spaced second sub-wires 41. In other embodiments of the present invention, each of the plurality of first wires 3 includes three parallelly spaced first sub-wires 31, and each of the plurality of second wires 4 includes three parallelly spaced second sub-wires 41.

Figure 2:
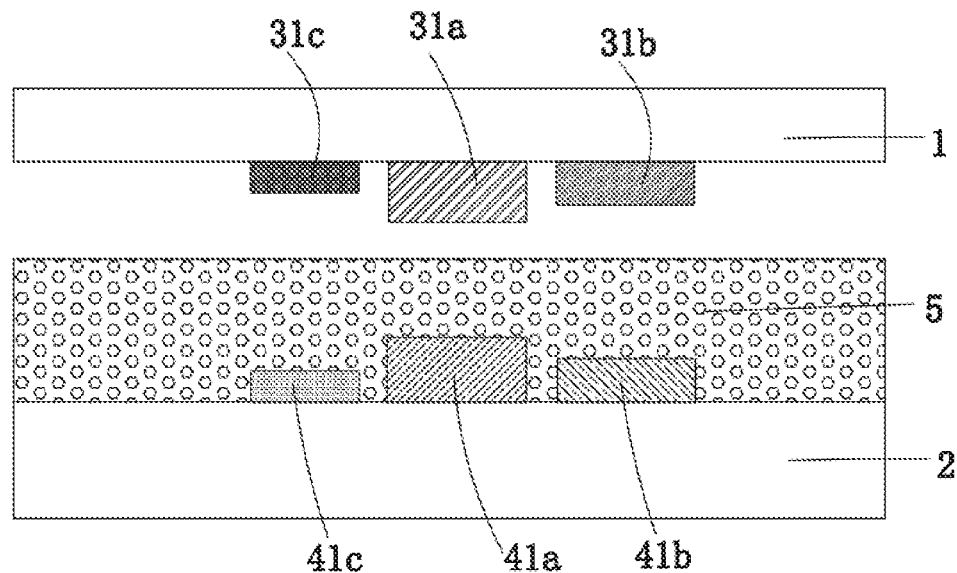
FIG. 2 is a sectional view of the resistive force touch control device according to the first embodiment of the present invention taken along line A-A of FIG. 1 without a force being exerted.
Figure 3:
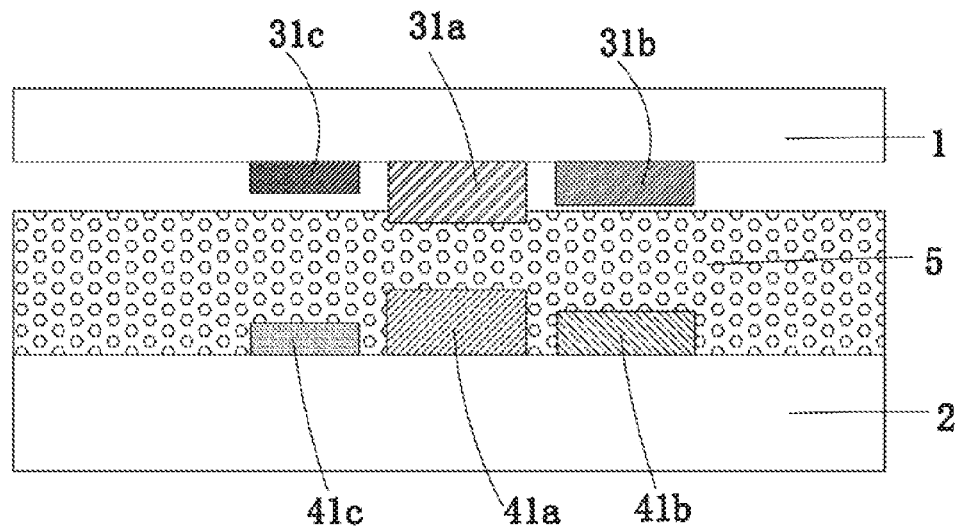
FIG. 3 is a sectional view of the resistive force touch control device according to the first embodiment of the present invention taken along line A-A of FIG. 1 when a first force is exerted.
Figure 4:
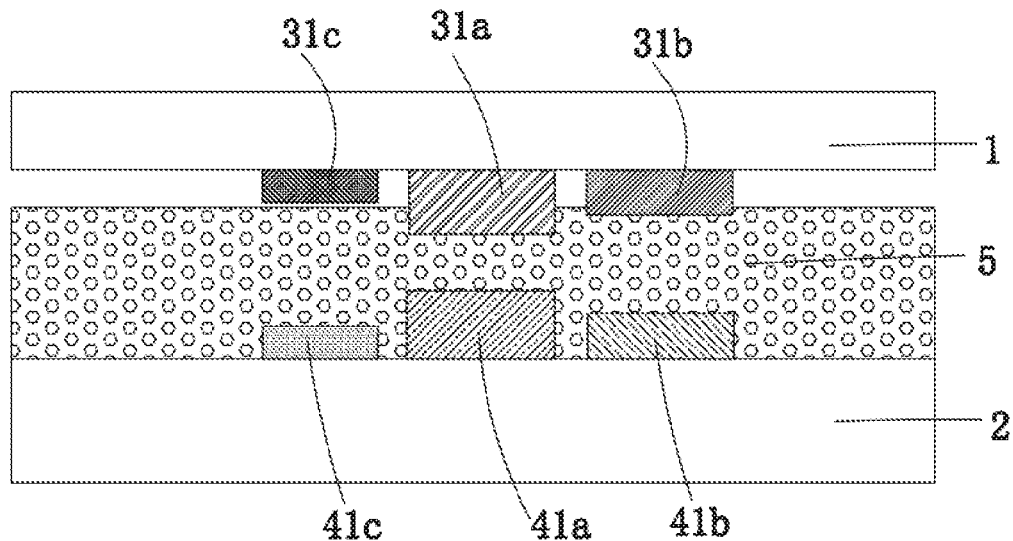
FIG. 4 is a sectional view of the resistive force touch control device according to the first embodiment of the present invention taken along line A-A of FIG. 1 when a second force is exerted.
Figure 5:
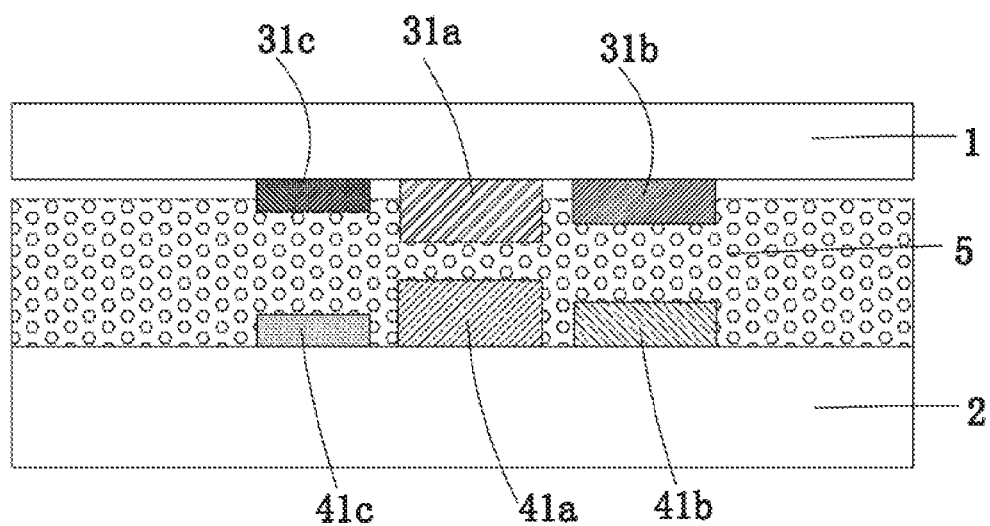
FIG. 5 is a sectional view of the resistive force touch control device according to the first embodiment of the present invention taken along line A-A of FIG. 1 when a third force is exerted.

Furthermore, as shown in FIG. 2, in the first embodiment of the present invention, the three first sub-wires 31 of each of the plurality of first wires 3 are the sub-wire 31a which has the highest height, the sub-wire 31b which is the second in height and the lowest 31c, respectively. The three second sub-wires 41 of each of the plurality of second wires 4 are the sub-wire 41a which has the highest height, the sub-wire 41b which is the second in height and the lowest 41c, respectively.

In particular, each of the plurality of second wires 4 further includes a binding terminal 42, the resistive force touch control device further includes a signal capturing module 100 electrically connected to each of the binding terminals 42, and one end of the N second sub-wires 41 of each of the plurality of second wires 4 is electrically connected to the corresponding binding terminal 42.

Advantageously, as shown in FIG. 1, in the first embodiment of the present invention, each of the plurality of first wires 3 is perpendicular to each of the plurality of second wires 4.

In particular, as shown in FIG. 2-FIG. 5, in the first embodiment of the present invention, when a force is exerted on the first substrate 1, the first substrate 1 presses down, and when the force is a first force, the sub-wire 31a and the sub-wire 41a become conductive through the first anisotropic conductive adhesive 5 such that the signal capturing module 100 captures a first feedback signal. If continuing to exert the force to a second force greater than the first force, the first substrate 1 continues to press down, the sub-wire 31a and the sub-wire 41a become conductive through the first anisotropic conductive adhesive 5, and simultaneously the sub-wire 31b and the sub-wire 41b become conductive through the first anisotropic conductive adhesive 5 such that the signal capturing module 100 captures a second feedback signal. If continuing again to exert the force to a third force greater than the second force, the first substrate 1 continues to press down, the sub-wire 31a and the sub-wire 41a become conductive through the first anisotropic conductive adhesive 5, the sub-wire 31b and the sub-wire 41b become conductive through the first anisotropic conductive adhesive 5, and simultaneously the sub-wire 31c and the sub-wire 41c become conductive through the first anisotropic conductive adhesive 5 such that the signal capturing module 100 captures a third feedback signal. Thereby a three-stage force feedback is achieved.

Figure 6:
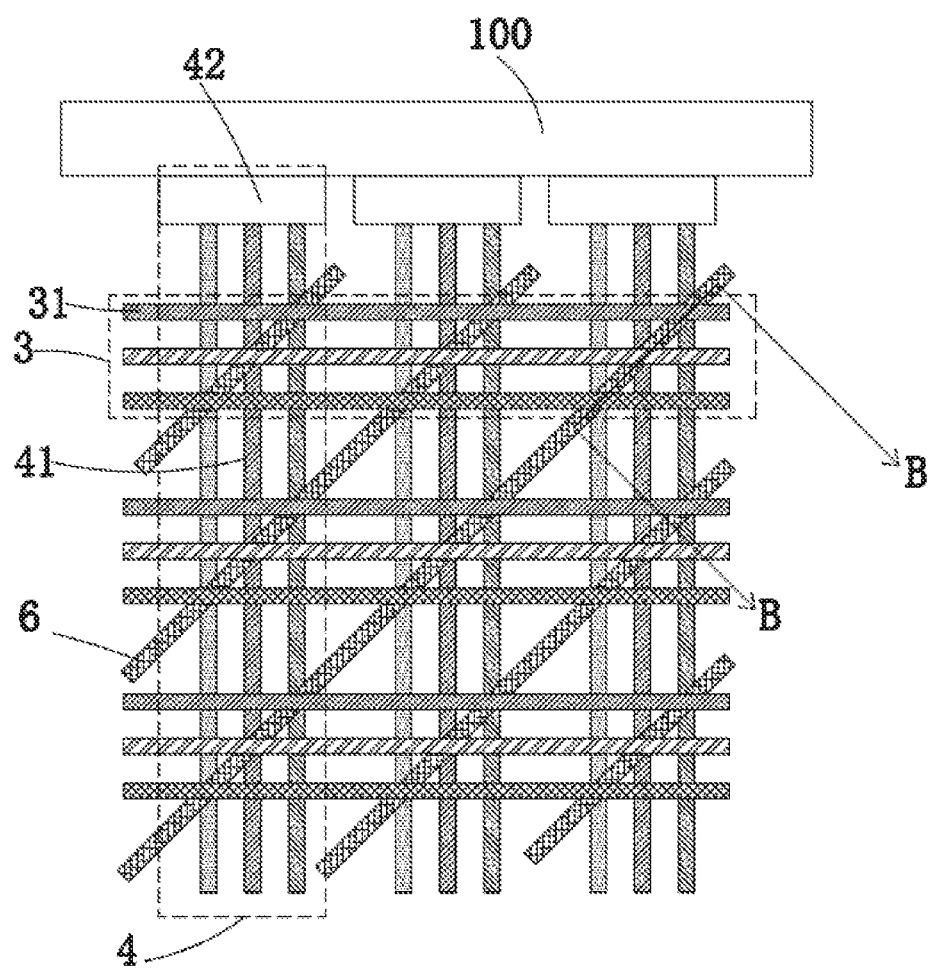
FIG. 6 is a top view of the resistive force touch control device according to the second embodiment of the present invention.
Figure 7:
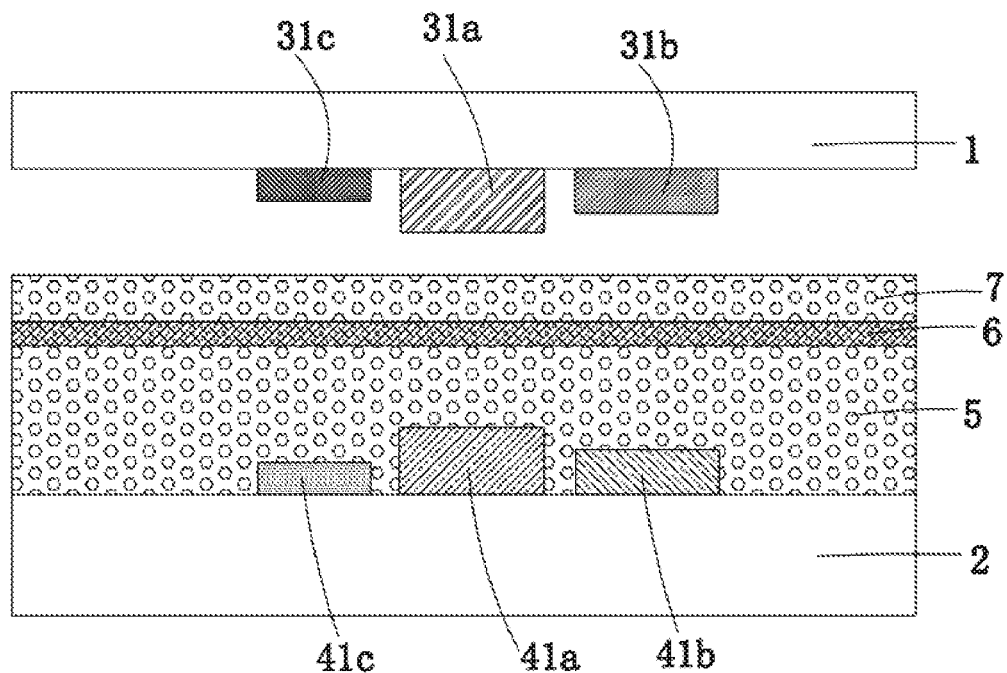
FIG. 7 is a sectional view of the resistive force touch control device according to the second embodiment of the present invention taken along line B-B of FIG. 6 without a force being exerted.
Figure 8:
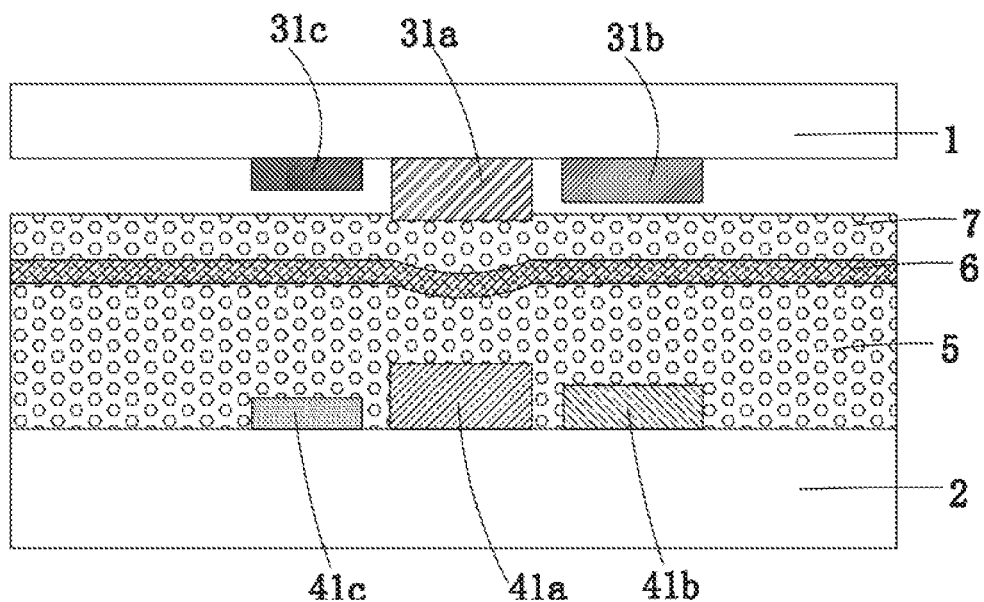
FIG. 8 is a sectional view of the resistive force touch control device according to the second embodiment of the present invention taken along line B-B of FIG. 6 when a first force is exerted.
Figure 9:
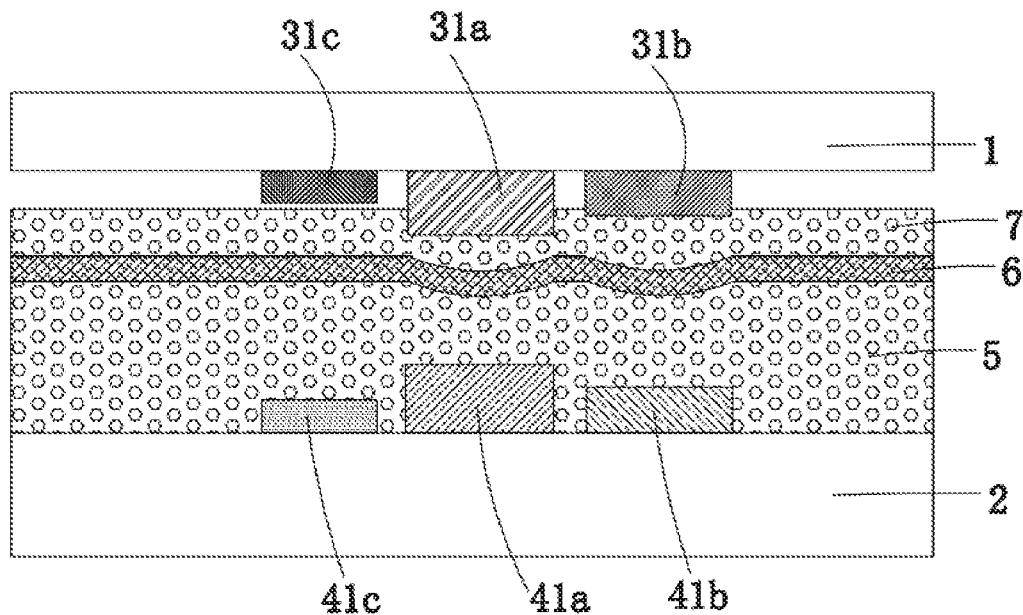
FIG. 9 is a sectional view of the resistive force touch control device according to the second embodiment of the present invention taken along line B-B of FIG. 6 when a second force is exerted.
Figure 10:
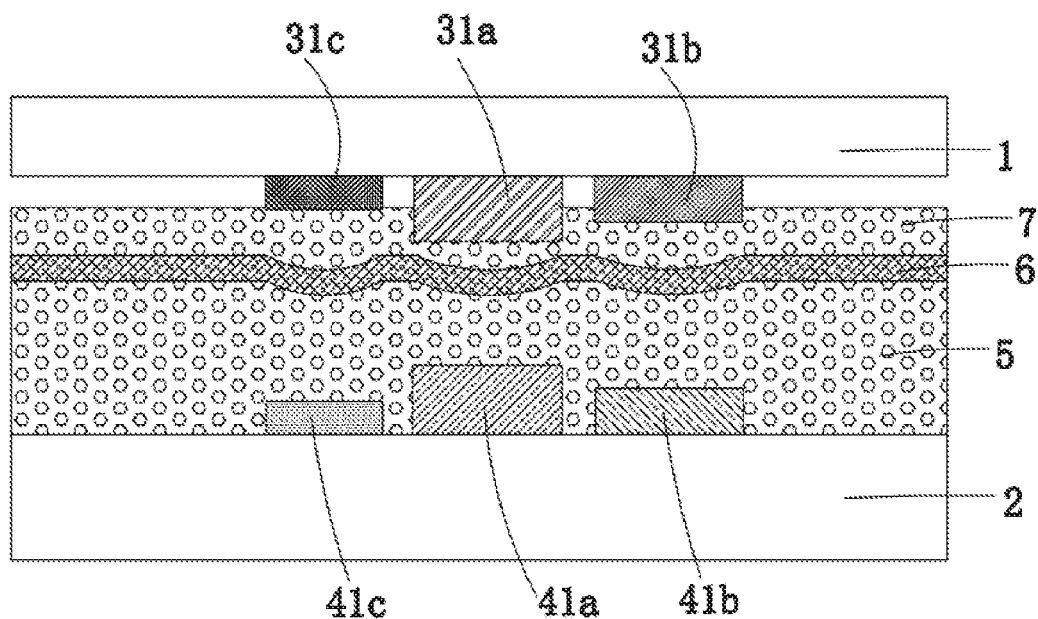
FIG. 10 is a sectional view of the resistive force touch control device according to the second embodiment of the present invention taken along line B-B of FIG. 6 when a third force is exerted.

In particular, as shown in FIG. 6, in the second embodiment of the present invention, for the sake of multi-touch the resistive force touch control device further includes a third wire 6 located between the first anisotropic conductive adhesive 5 and the plurality of first wires 3, and a second anisotropic conductive adhesive 7 located between the third wire 6 and the plurality of first wires 3. The third wire 6 intersects the plurality of first wires 3 and the plurality of second wires 4 at the positions where each of the plurality of first wires 3 intersects each of the plurality of second wires 4.

Advantageously, each of the plurality of first wires 3 is perpendicular to each of the plurality of second wires 4, and the third wire 6 slants with respect to each of the plurality of first wires 3. Still advantageously, the third wire 6 slants at a forty-five degrees angle with respect to each of the plurality of first wires 3.

In particular, as shown in FIG. 7-FIG. 10, in the second embodiment of the present invention, when a force is exerted on the first substrate 1, the first substrate 1 presses down, and when the force is a first force, the sub-wire 31a and the third wire 6 become conductive through the second anisotropic conductive adhesive 7, and the sub-wire 41a and the third wire 6 become conductive through the first anisotropic conductive adhesive 5 such that the signal capturing module 100 captures a first feedback signal. If continuing to exert the force to a second force greater than the first force, the first substrate 1 continues to press down, the sub-wire 31a and the third wire 6 become conductive through the second anisotropic conductive adhesive 7, the sub-wire 41a and the third wire 6 become conductive through the first anisotropic conductive adhesive 5, the sub-wire 31b and the third wire 6 become conductive through the second anisotropic conductive adhesive 7, and the sub-wire 41b and the third wire 6 become conductive through the first anisotropic conductive adhesive 5 such that the signal capturing module 100 captures a second feedback signal. If continuing again to exert the force to a third force greater than the second force, the first substrate 1 continues to press down, the sub-wire 31a and the third wire 6 become conductive through the second anisotropic conductive adhesive 7, the sub-wire 41a and the third wire 6 become conductive through the first anisotropic conductive adhesive 5, the sub-wire 31b and the third wire 6 become conductive through the second anisotropic adhesive 7, the sub-wire 41b and the third wire 6 become conductive through the first anisotropic conductive adhesive 5, the sub-wire 31c and the third wire 6 become conductive through the second anisotropic conductive adhesive 7, and the sub-wire 41c and the third wire 6 become conductive through the first anisotropic conductive adhesive 5 such that the signal capturing module 100 captures a third feedback signal. Thereby a multi-touch three-stage force feedback is achieved.

Figure 11:
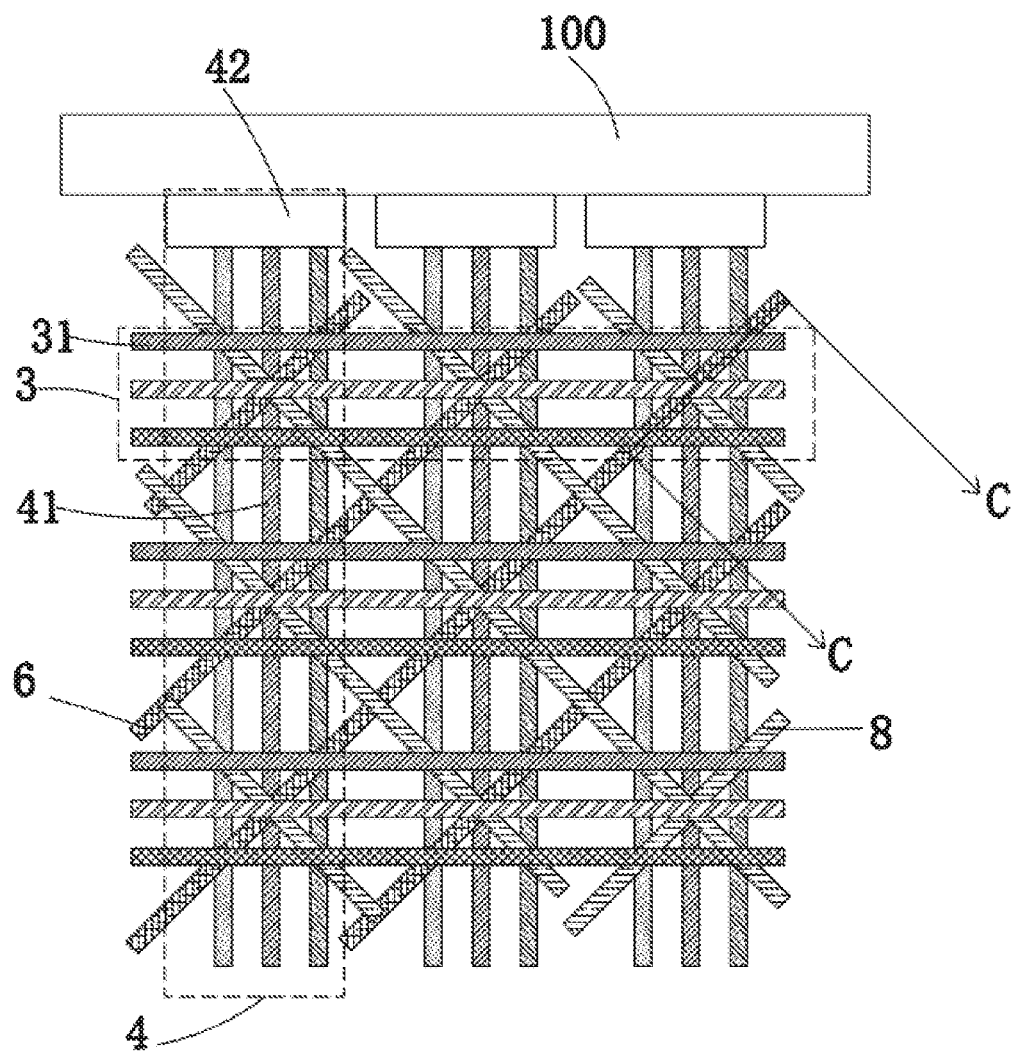
FIG. 11 is a top view of the resistive force touch control device according to the third embodiment of the present invention.
Figure 12:
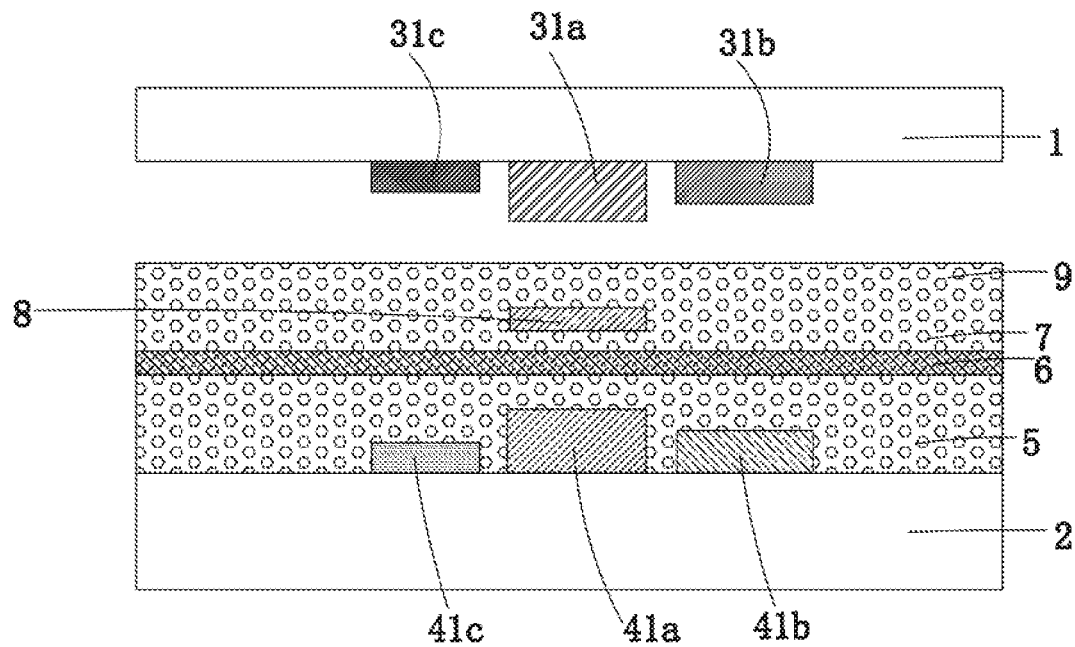
FIG. 12 is a sectional view of the resistive force touch control device according to the third embodiment of the present invention taken along line C-C of FIG. 11 without a force being exerted.
Figure 13:
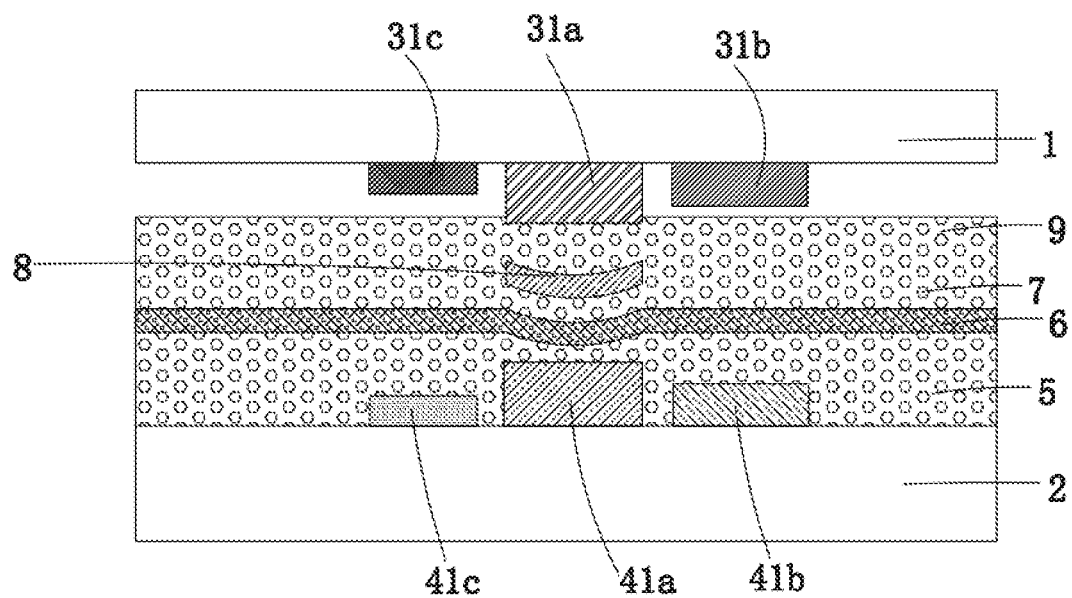
FIG. 13 is a sectional view of the resistive force touch control device according to the third embodiment of the present invention taken along line C-C of FIG. 11 when a first force is exerted.
Figure 14:
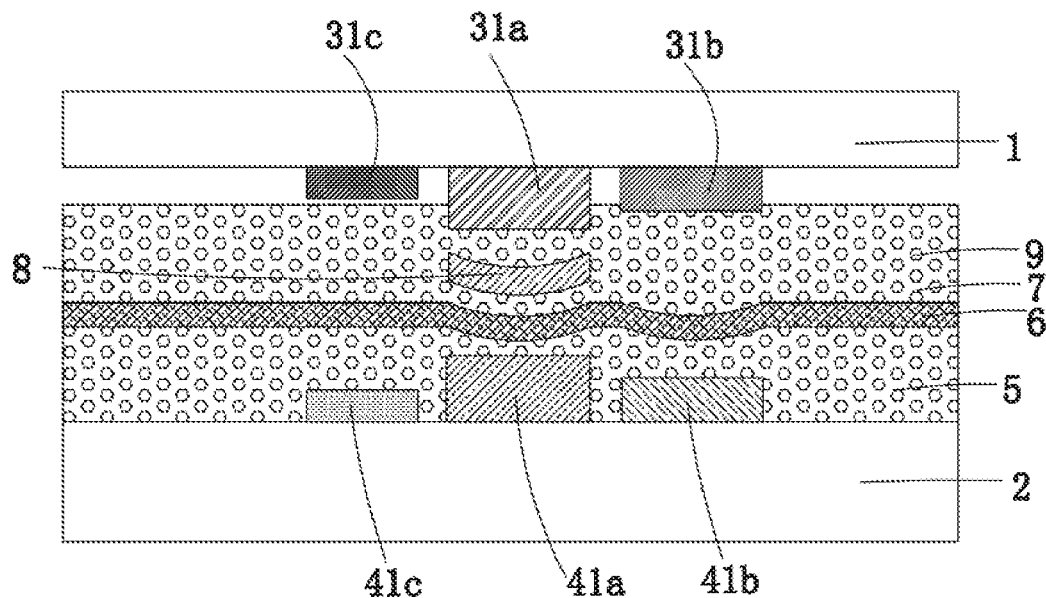
FIG. 14 is a sectional view of the resistive force touch control device according to the third embodiment of the present invention taken along line C-C of FIG. 11 when a second force is exerted.
Figure 15:
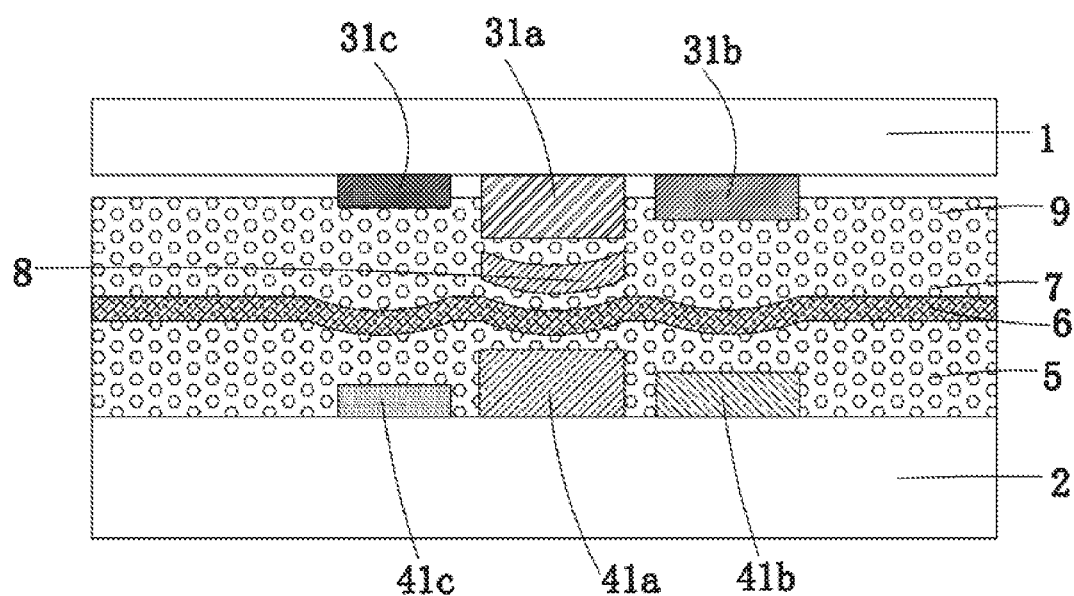
FIG. 15 is a sectional view of the resistive force touch control device according to the third embodiment of the present invention taken along line C-C of FIG. 11 when a third force is exerted.

Furthermore, as shown in FIG. 11, in the third embodiment of the present invention, the resistive force touch control device further includes a fourth wire 8 located between the second anisotropic conductive adhesive 7 and the plurality of first wires 3, and a third anisotropic conductive adhesive 9 located between the fourth wire 8 and the plurality of first wires 3. The fourth wire 8 intersects the third wire 6, the plurality of first wires 3 and the plurality of second wires 4 at the positions where the third wire 6, each of the plurality of first wires 3, and each of the plurality of second wires 4 intersect each other. As shown in FIG. 12-FIG. 15, the third embodiment can also achieve a multi-touch three-stage force feedback by a process consistent with the second embodiment.

Advantageously, each of the plurality of first wires 3 is perpendicular to each of the plurality of second wires 4, the third wire 6 slants with respect to each of the plurality of first wires 3, and the forth wire 8 is perpendicular to the third wire 6. Still advantageously, the third wire 6 slants at a forty-five degrees angle with respect to each of the plurality of first wires 3, and the plurality of first wires 3, the plurality of second wires 4, the third wire 6 and the fourth wire 8 form a double cross pattern.

The present invention therefore integrates force touch with resistive touch control devices. By directly using various connections between resistors under various force degrees to yield various electric signals and therefore accomplishing force degree feedbacks, the need of adding an isolated force touch control device can be avoided. The electric conductivity of input medium does not limit the using of touch control devices, anything that is capable of exerting force can be used to input, and also the structure is simple and the cost of production is low.

In summary, the present invention provides a resistive force touch control device including a first substrate and a second substrate spaced facing one another, a plurality of first wires parallelly spaced from one another and disposed on one side of the first substrate facing the second substrate, a plurality of second wires parallelly spaced from one another and disposed on one side of the second substrate facing the first substrate, and first anisotropic conductive adhesive located between the plurality of first wires and the plurality of second wires. The plurality of first wires intersects the plurality of second wires. Each of the plurality of first wires includes N first sub-wires parallelly spaced from one another, and the N first sub-wires of the same first wire have different heights, and each of the plurality of second wires includes N second sub-wires parallelly spaced from one another, and the N second sub-wires of the same second wire have different heights, and N is a positive integer greater than one. When a force is exerted on the resistive force touch control device, the first sub-wires and the second sub-wires connect each other in order of their corresponding heights as the degree of the force increases, that is, from the sub-wires with higher heights to the sub-wires with lower heights, to produce various touch signals. Therefore force touch can be realized in resistive touch control devices, the structure of force touch control devices can be simplified, the cost can be reduced and the range of the application of force touch can be widened.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A resistive force touch control device comprising:
   a first substrate and a second substrate spaced facing one another;
   a plurality of first wires parallelly spaced from one another and disposed on one side of the first substrate facing the second substrate;
   a plurality of second wires parallelly spaced from one another and disposed on one side of the second substrate facing the first substrate;
   first anisotropic conductive adhesive located between the plurality of first wires and the plurality of second wires, wherein the plurality of first wires intersects the plurality of second wires; and
   a third wire located between the first anisotropic conductive adhesive and the plurality of first wires, and a second anisotropic conductive adhesive located between the third wire and the plurality of first wires, wherein the third wire intersects the plurality of first wires and the plurality of second wires at the positions where each of the plurality of first wires intersects each of the plurality of second wires;
   wherein each of the plurality of first wires includes N first sub-wires parallelly spaced from one another, and the N first sub-wires of the same first wire have different heights, and wherein each of the plurality of second wires includes N second sub-wires parallelly spaced from one another, and the N second sub-wires of the same second wire have different heights, and N is a positive integer greater than one.

2. The resistive force touch control device as claimed in claim 1, wherein each of the plurality of first wires includes two parallelly spaced first sub-wires, and each of the plurality of second wires includes two parallelly spaced second sub-wires.

3. The resistive force touch control device as claimed in claim 1, wherein each of the plurality of first wires includes three parallelly spaced first sub-wires, and each of the plurality of second wires includes three parallelly spaced second sub-wires.

4. The resistive force touch control device as claimed in claim 1, wherein each of the plurality of second wires further comprises a binding terminal, and one end of the N second sub-wires of each of the plurality of second wires is electrically connected to the corresponding binding terminal.

5. The resistive force touch control device as claimed in claim 4 further comprising a signal capturing module electrically connected to each of the binding terminals.

6. The resistive force touch control device as claimed in claim 1, wherein each of the plurality of first wires is perpendicular to each of the plurality of second wires.

7. The resistive force touch control device as claimed in claim 1, wherein each of the plurality of first wires is perpendicular to each of the plurality of second wires, and the third wire slants with respect to each of the plurality of first wires.

8. The resistive force touch control device as claimed in claim 1 further comprising a fourth wire located between the second anisotropic conductive adhesive and the plurality of first wires, and a third anisotropic conductive adhesive located between the fourth wire and the plurality of first wires, wherein the fourth wire intersects the third wire, the plurality of first wires and the plurality of second wires at the positions where the third wire, each of the plurality of first wires, and each of the plurality of second wires intersect each other.

9. The resistive force touch control device as claimed in claim 8, wherein each of the plurality of first wires is perpendicular to each of the plurality of second wires, the third wire slants with respect to each of the plurality of first wires, and the forth wire is perpendicular to the third wire.

* * * * *